May 14, 1940. L. CRISTIANI ET AL 2,200,466
APPARATUS FOR COLOR PHOTOGRAPHY
Filed Jan. 18, 1937
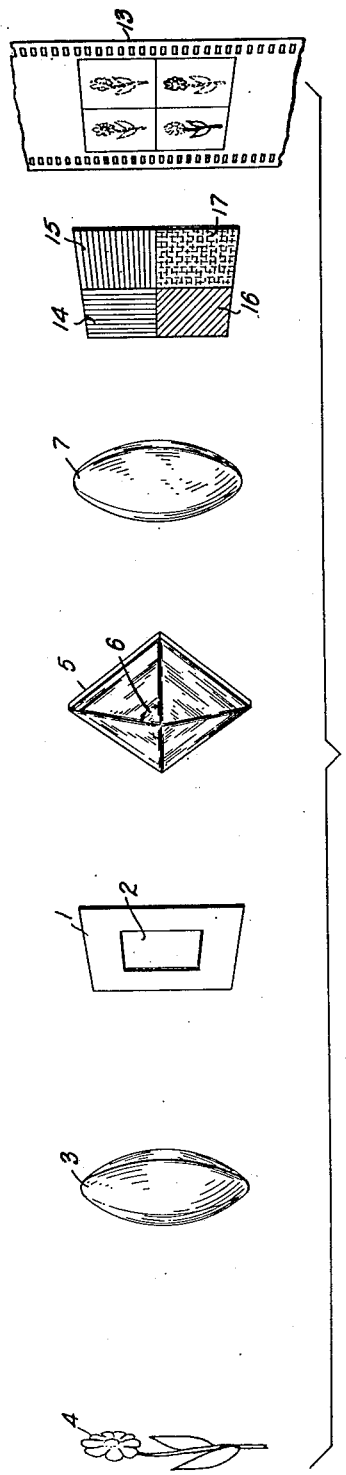
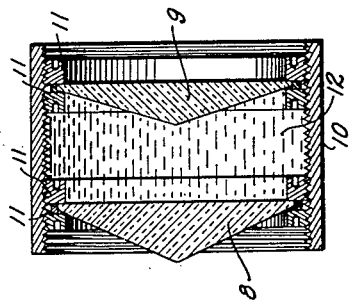
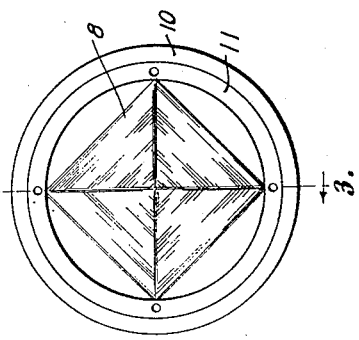
INVENTORS
Luigi Cristiani
Giovanni Mascarini
BY Thos. E. Scofield
ATTORNEY Patented May 14, 1940

2,200,466

UNITED STATES PATENT OFFICE 2,200,466

APPARATUS FOR COLOR PHOTOGRAPHY

Luigi Cristiani, Voghera, and Giovanni Mascarini, Milan, Italy

Application January 18, 1937, Serial No. 121,227
In Germany January 15, 1934

2 Claims. (Cl. 88—16.4)

Our invention relates to an apparatus for color photography, and more particularly to an apparatus for photographing in such manner that the subject photographed may be reproduced in colors simulating or approaching the natural coloring of the subject, it being understood that our invention applies to motion pictures as well as "stills."

This application is a continuation-in-part of our co-pending applications, Serial No. 1,250, filed January 10, 1935, and Serial No. 87,062, filed June 24, 1936.

It has been suggested in the prior art to photograph a subject in such manner as to obtain a plurality of identical images by means of a plurality of lenses or lens systems recording each of the images in predetermined, spaced relation upon a sensitized medium through a plurality of color filters and then obtain an image by simultaneously projecting each of the images through colored filters upon a screen in such manner that the images will be superimposed. This system has not been susceptible of practical application due to the insurmountable difficulty of producing a large number of identical lenses, which, furthermore, must be mounted with such accuracy as to give each image on the same focal plane. Obviously, the optical system of the projection apparatus must be identical with that which photographed the picture.

It has likewise been proposed to obtain a plurality of images by means of prisms for deviating the rays of the real image so as to form a plurality of images upon the sensitized medium. The same difficulties which are presented by lenses are also present when a plurality of prisms are employed and great difficulty is experienced in the practical application of this system, first, in obtaining a plurality of prisms identical with each other in optical properties, and further, the positioning of the prisms with respect to each other so as to produce identical deviation is impossible of practical achievement. The result has been that in other proposed systems the same optical system which has taken the picture must be used for projecting it. In commercial motion picture work, it is essential that a film taken with one camera may be projected by any number of projectors irrespective of the camera which photographed the film. Furthermore, if the prisms are interposed in the second objective or placed behind it, the angles of the prisms must be so great that an astigmatic effect is produced. Then, too, there is the well known effect of a prism, the angle of which is great, to divide a ray of white light into its component colors, giving rise to what is known as chromatic aberration.

It will be obvious that in order to produce a clear picture of color value approaching that of the subject or scene photographed, the several images must be exactly, or almost exactly, superimposed. For practical results, a tolerance of not more than one hundredth of a millimeter is permissible on the film.

One object of our invention is to provide an apparatus for color photography and cinematography in which a plurality of images are formed in accordance with a function of the individual components of color values of a complete picture and monochrome projections of the individual images in accordance with the color by which they were produced are projected in superimposed relation upon a common plane, in which the disadvantages of the prior art are minimized or obviated.

Another object of our invention is to provide an apparatus for color photography and cinematography in which ordinary panchromatic film may be used.

A further object of our invention is to provide an achromatic prism of such construction that it is easily susceptible of commercial production in quantity with such accuracy that films made with the apparatus of our invention may be projected by any projector made in accordance with our invention.

Another object of our invention is to provide an apparatus for color photography in which the luminosity of the field is increased so that color photography may be practiced in ordinary light and rapidly moving subjects can be photographed for reproduction in color with ease.

Another object of our invention is to provide an optical system in which the field of standard lenses is increased.

A further object of our invention is to provide an optical system whereby the light-transmitting power of a given objective is increased.

Other and further objects of our invention will appear from the following description.

In the accompanying drawing, which forms a part of the instant specification and which are to be read in conjunction therewith and in which like reference numerals are used to indicate like parts in the various views:

Fig. 1 is a diagrammatic view showing the optical system of our apparatus, it being understood, of course, that the same system is to be used for projecting with a light source behind the transparent film.

Fig. 2 is a plan view of a prism assembly adapted to be used in carrying out our invention.

Fig. 3 is a sectional view taken on the line 3—3 of Fig. 2.

In general, our invention contemplates the focusing of the subject to be photographed by means of any suitable objective upon an opaque screen provided with an aperture of predetermined dimensions. The reproducing of the image in said aperture in four identical images by a monoblock prism placed in such position that the four images would appear in exactly juxtaposed position and the projecting of the four images formed by the prism upon panchromatic, sensitized plate or film through any suitable filters.

More particularly, referring now to the drawing, an opaque screen 1 is formed with an aperture 2, which may be of any suitable size. Assuming for purposes of illustration but not by way of limitation, that we are employing standard 35 millimeter film, the window aperture 2 will be a square of 36 x 36 millimeters. An objective lens 3 of any suitable type is adapted to focus the subject 4 upon the opaque screen 1 so that if a ground glass were placed in the aperture 2, an image of the subject 4 would be reproduced on the ground glass screen in exact focus. Behind the screen 1 there is a monoblock prism 5 having four faces, each of which is inclined equally to a small angle, as, for example, four degrees. If the faces are exactly inclined, each angle 6 will be exactly 90°. In practice, the angle 6 may be 90° plus or minus 10 seconds, since a deviation of 20 seconds will be sufficiently accurate for practical purposes. If the prismatic member is shifted from the aperture and one looks through the same with the eye, it will be observed that at a certain point there will be seen through the prism four apertures exactly juxtaposed with respect to each other. If in the plane of the aperture there is placed, for example, a drawing, four equal drawings will be seen in each of the four windows in exactly juxtaposed relation. If instead of the drawing there is erected in the aperture the real image of any subject, as would be the case if the objective 3 were placed in such position that the screen 1 were in its focal plane, there will be seen through the prism 4 conjugated images of the subject. If for the eye there is substituted a lens 7, the lens will always see four juxtaposed images and will be adapted to project four images upon a surface placed in the focal plane of the lens 7. It will be understood, of course, that the dimensions of the images projected by lens 7 will vary in accordance with the focal length of the lens 7 and the position of said lens with respect to said window screen 1. It will be obvious, therefore, that with a 35 millimeter film, if it is desired, for example, to form four images each of which are 9 x 9 millimeters, in order to remain within the moving picture dimensions of 18 millimeters the lens 7 must be placed at such distance from the window screen 1 as to reduce the size of the window from 36 x 36 millimeters to 9 x 9 millimeters.

With our optical system, it will be noted that the sole determining features of juxtaposition of the four images is the distance at which the prism is placed from the window screen 1, and it is not necessary to use any other optical members. Any suitable lenses, therefore, can be used in front of and in back of the aperture, since they do not influence the juxtaposition of the images. It will be further apparent that in order that commercial use may be made of our system, the prisms must be made in quantity, each of which is identical with or substantially identical with each of the others. Any inaccuracy in the prism will result, when projection is had, in a plurality of images which are not exactly, or substantially exactly, superimposed, and the clarity of the picture as well as the color values will be distorted.

It will be further obvious that the rear lens 7 will give images always juxtaposed if the prism is located at the exact juxtaposition distance. Likewise, the rear lens will always give images separated from each other in the same proportion if the prism is placed in such a position that the images are separated, the rear lens affecting only the dimensions of the images, that is, the displacement of the centers of the images. In order that any lens may be used in connection with the projection or photographing in accordance with our invention, the prism 5 is always placed at such a position as to give four images in exactly juxtaposed position, that is, the bottom of the upper left-hand image will form the border line of the upper border of the lower left-hand image and the right-hand border line of the upper left-hand image will exactly coincide with the left border line of the upper right-hand image. Similarly, the lower border line of the upper right-hand image will exactly coincide with the upper border line of the lower right-hand image and the left border line of the lower right-hand image will coincide with the right border line of the lower left-hand image. In this manner, inaccuracies or dissimilarities in several lenses will have no effect upon the accuracy of superimposition when the film is projected, as will be hereinafter more fully described. It will be obvious to those skilled in the art that the sole determining feature of the accuracy of superimposition will depend upon the accuracy with which the prism is made and the distance of the prism from the window aperture 2.

In the formation of chromatic pictures by the synthetic integration of a plurality of similar monochrome images of the same subject, commercial success will depend upon the ability to superimpose the various images exactly upon each other with accuracy and ease, and the means for so superimposing the several images must be susceptible of quantity production wherein each means is capable of identical or substantially identical performance. It will be observed that by means of our system small angles may be given to the prism, and in this manner both spherical and chromatic aberration is minimized. In order to correct, however, any tendency of chromatic aberration due to the fact that rays of different colors will focus at different points, we make our prism as shown in Figures 2 and 3. The first point of importance is that our prisms are ground from a single block of optical glass, that is, they are monoblock in construction. Each of the prism faces are right triangles, and in order to get sufficient interchangeability the right angle can not be varied from more than plus or minus ten seconds. It follows that, since the four faces of the prism are ground from one block of optical glass, the angles arranged along the axis of displacement will be optically established and remain constant. In order to eliminate chromatic aberration, we employ the structure shown in Figures 2 and 3. Two monoblock prisms 8 and 9 are mounted in any suitable mounting means, as, for example, mounting tube 10. The angle of deviation of the four faces in prism 8 is greater than that in prism 9. The two prisms are assembled as shown in Fig. 3 and held in position by means of mounting rings 11. The space between the prisms 8 and 9 is filled with a liquid 12 having great dispersive power. We prefer to use high boiling, optically clear organic liquids, such as methyl cinnamate boiling at 259° C., methyl caprate boiling at 224° C., ethyl cinnamate boiling at 271° C., linalyl acetate boiling at 220° C., meta meta prime ditolyl boiling at 288° C., dimethylmalate boiling at 242° C., alpha citral boiling at 299° C., cinnamic aldehyde boiling at 251° C., normal butyl starate boiling at 220° C., benzyl ether boiling at 298° C., ortho anisidine boiling at 224° C., parameth-oxybenzaldehyde boiling at 247° C.

The relative position of the two monoblock prisms has no influence on the deviation angle. The deviation angles of the various images depend solely upon the optical construction of the monoblock, which construction may be made substantially perfect, an accuracy of plus or minus five seconds being easily achieved, though plus or minus ten seconds would be tolerable. The assembly just described, that is, the use of two monoblock prisms with a liquid of high dispersive power positioned there between will substantially eliminate all chromatic aberration of prism 8. We would again like to reiterate that the use of monoblock prisms is an important feature of our invention and that it is substantially impossible to assemble separate prisms and obtain identical results so as to be able to project film photographed with one optical arrangement with another optical system. With our arrangement, the prisms are always arranged in a constant relation to each other along the optical axis.

The objective 7 is of such focal length and is placed at such distance that it will focus four juxtaposed images upon a sensitive plate or film 13. For color photography each of the images will be such that it will be made substantially by the action of a single color, which result is obtained by the use of filters. One of the images, for example, will be made substantially by red light, filter 14 allowing red rays to pass. Filter 15 allows an image made by blue light, the filter being such as to allow blue rays to pass. Filter 16 allowing green rays to pass, the image produced on the film will be made preponderantly by green light, and an image passing through yellow filter 17 will affect the film largely by yellow light. It is understood, of course, that the film must be panchromatic, that is, it must be sensitive to all colors. It is understood, of course, that the filter must be accurately aligned. The filter may be placed in any desired position, and if desired, the four inclined faces of the prism 5 may be tinted to act as filters, thus insuring at all times that each image will be of desired monochrome.

In nature, when colors are observed, the various colors are seldom saturated, since as the eye observes them they are flooded with light and each color is diluted, so to speak, with the white light. In the color processes now used, an artificial effect is produced due to the sharpness of color changes and the effect is not natural. If we want to have the sensation of color as the same is observed in nature, we must see the color more or less with the same degree of dilution. In observing motion pictures, the projection room is usually darkened and the dilution of color must be given by the filter itself in such a way that the filter will permit not only the color corresponding to it to pass but also to permit the passage of a certain quantity of white light. Accordingly, our filters are very light, permitting the total passage of sixty to eighty per cent of the light, while standard filters permit only thirty to forty per cent of the light to pass. Furthermore, panchromatic film is not equally sensitive to all colors and in order to compensate for the various sensitivities of the film we vary the filter color accordingly. For example, if a film is more sensitive to yellow than to red, the yellow filter will be of darker color than the red in order to bring the sensitivity of the film to a substantially common plane, thus avoiding over-exposure of one color and under-exposure of another color.

It will be observed that the area of the four images on the film in the example given is 18 x 18 millimeters, while the area of the aperture is 36 x 36 millimeters. The light from an area 36 x 36 millimeters is concentrated upon an area 18 x 18 millimeters, so that the film will be illuminated four times more strongly than by the illumination given by the first objective lens. For example, if the lens 3 had an illumination of 1 to 1.5 effective illumination would be 1 to .37. It will be readily apparent to those skilled in the art that with suitable ratios between the area of the aperture 2 and the area occupied by the four small images on the film, very great luminosity may be obtained.

What is true for luminosity is also true for the field. It will be observed that if in the aperture used by way of illustration, namely, 36 x 36 millimeters, we form an image given by 50 millimeter lens, the field in that aperture is exactly double that which is obtained with an aperture of 18 x 18 millimeters, which would be the normal image given by a 50 millimeter lens on a standard field. It follows, therefore, that the field of the four images of 9 x 9 millimeters, each of which reproduces the field contained in an aperture of 36 x 36 millimeters, will be twice that of the normal value, thus enabling the obtaining of large fields by the use of standard lenses.

The projection of our film to obtain a colored image will be clear to those skilled in the art. From the negative obtained, a positive is printed on film if it is desired to have colored moving pictures. Each of the images having been formed by monochrome light, will represent a similar proportion of that particular color in the subject which was photographed. Each of the images is passed through a filter of color corresponding to that with which it was taken and the prism will combine the various images into one, superimposing them exactly upon the focal plane of the objective lens 3, forming a complete picture in natural colors analogous to that obtained by four color printing.

To obtain colored prints, it is possible to have a multicoated paper with emulsions sensitive to various colors on which the images are projected in superimposed relation by means of a projection system comprising our optical system. For example, if it is desired to make a color transparency using "Kodachrome" or "Dufay" film, the positive is projected by means of our projection apparatus through filters upon the film and the film developed in accordance with the particular process designed for it.

It will be observed that we have accomplished the objects of our invention. We have provided an apparatus for color photography in which ordinary panchromatic film may be used. We have provided an achromatic prism which is easily susceptible of production in commercial quantities in such accuracy that films made with one optical system according to our invention may be projected accurately with another optical system also made in accordance with our invention.

We have provided apparatus for color photography in which the luminosity of the field is increased and in which standard lenses may be employed to obtain increased fields.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In an optical system for color photography, an opaque screen, said screen being provided with a window aperture, a prism having a plurality of light refracting surfaces for providing a plurality of complete light beams corresponding to said aperture in predetermined relation, an objective positioned in front of said screen, the focal plane of said objective being in the plane of said screen, a second objective positioned behind said screen to project the plurality of beams in predetermined separate relation upon a sensitized surface, means to support the sensitized surface in the focal plane of the second objective, said prism being an assembly comprising a first prism having a plurality of refracting surfaces, a second prism having refracting surfaces symmetrical with the surfaces of said first prism, means for supporting said prisms in spaced relation upon a common optical axis, and a liquid refractor between said prisms.

2. In an optical system for color photography, an opaque screen provided with a window aperture, an objective positioned in front of said screen, a focal plane of said objective being in the plane of said screen, a prism positioned behind said screen having a plurality of light refracting surfaces for providing a plurality of complete light beams corresponding to said aperture in predetermined relation, a second objective positioned behind said prism to project the plurality of beams in predetermined and separate relation upon a sensitized surface, means to support the sensitized surface in the focal plane of the second objective, said prism being an assembly comprising a first prism having a plurality of refracting surfaces, a second prism having refracting surfaces symmetrical with the surfaces of said first prism, means for supporting said prisms in spaced relation upon a common optical axis, and a liquid refractor between said prisms.

LUIGI CRISTIANI.
GIOVANNI MASCARINI.